(12) United States Patent
Euler et al.

(10) Patent No.: US 7,546,217 B2
(45) Date of Patent: Jun. 9, 2009

(54) METHOD FOR DETERMINING THE ORIENTATION OF AN ANTENNA ARRAY

(75) Inventors: Hans-Jürgen Euler, Heerbrugg (CH); Craig D. Hill, Balgach (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/814,066

(22) PCT Filed: Jan. 18, 2006

(86) PCT No.: PCT/EP2006/050292

§ 371 (c)(1),
(2), (4) Date: Aug. 31, 2007

(87) PCT Pub. No.: WO2006/077229

PCT Pub. Date: Jul. 27, 2006

(65) Prior Publication Data

US 2008/0097722 A1    Apr. 24, 2008

(30) Foreign Application Priority Data

Jan. 22, 2005    (EP) .................................. 05001286

(51) Int. Cl.
*G06F 19/00* (2006.01)
(52) U.S. Cl. ...................................... 702/151; 702/150
(58) Field of Classification Search ............ 342/357.04, 342/357.11, 377; 702/150, 151
See application file for complete search history.

(56) References Cited

U.S. PATENT DOCUMENTS 5,296,861 A * 3/1994 Knight .................. 342/357.11
5,548,293 A   8/1996 Cohen et al.
5,561,432 A   10/1996 Knight et al.

(Continued)

FOREIGN PATENT DOCUMENTS

EP    0437372    7/1991

(Continued)

OTHER PUBLICATIONS

Euler, H-J et al., "GPS Attitude Determination: Utilizing Auxiliary Information to Obtain Improved Results," 3rd Int. Workshop, "High Precision Navigation," Apr. 3-5, 1995, Stuttgart.

(Continued)

*Primary Examiner*—Edward R Cosimano
*Assistant Examiner*—Douglas N Washburn
(74) *Attorney, Agent, or Firm*—Workman Nydegger

(57) ABSTRACT

The aim of the invention is to limit the number of possible phase ambiguity resolutions when taking measurements by means of satellite-aided positioning systems. Said aim is achieved by a method which allows the search sector to be better restricted. To this avail, information about the geometry of an antenna array is used for establishing restrictions for said antenna array. Said restrictions allow the search sector and thus the number of acceptable resolutions to be successively reduced. A restriction comprises the utilization of the connecting line between two antennas (A0, A1) that define a primary base line (S01). An additional, secondary base line (S0x) can be calculated by inventively parameterizing the degree of rotational freedom of said secondary base line (S0x) about the primary base line (S01) such that the process is accelerated.

14 Claims, 3 Drawing Sheets

U.S. PATENT DOCUMENTS 5,757,316 A * 5/1998 Buchler .................. 342/357.11
6,313,788 B1 * 11/2001 Wilson .................. 342/357.11

FOREIGN PATENT DOCUMENTS

WO          WO9923505       5/1999

OTHER PUBLICATIONS

Hill, C. D. et al., "An Optimal Ambiguity Resolution Technique for Attitude Determination," Proceedings of the 1996 IEEE Position Location and Navigation Symposium, PLANS, Atlanta, Georgia, USA, pp. 263-269.

Euler, Dr.-Ing. Hans-Jü and Hill, Craig D., "Attitude Determination: Exploiting all information for Optimal Ambiguity Resolution," Leica AG, Ch-9435 Heerbrugg, Switzerland, presented at ION GPS 95, Sep. 12-15, 1995, Palm Springs, CA, (pp. 1-7).

Hill, Craig D. and Euler, Dr.-Ing. Hans-Jü, "An Optimal Ambiguity Resolution Technique for Attitude Determination," Leica AG, CH-9435 Heerbrugg Switzerland, BNSDOCID: XP10163386A1>, (pp. 262-269), 1996 IEEE Position and Navigation Symposium.

Euler, Dr.-Ing, Hans-Jü, "GPS Attitude Determination: Utilizing Auxiliary Information To Obtain Improved Results," $3^{rd}$ Int. Workshop, "High Precision Navigation", Apr. 3-5, 95, Stuttgart, (pp. 1-7).

* cited by examiner

METHOD FOR DETERMINING THE ORIENTATION OF AN ANTENNA ARRAY

The invention relates to a method for determining the orientation of an antenna array for a satellite-aided positioning system and a computer program product.

In the determination of positions or orientations by means of satellite-aided positioning systems, signals from satellites are received by antennae or receivers, from which signals the position of the antennae can be determined. If these antennae are mounted, for example, on a vehicle, the position of this vehicle can be determined. By using a plurality of antennae, positions thereof and hence further information about the orientation of the vehicle can be obtained. By using at least three antennae fixed to vehicles and having a known geometrical arrangement, it is finally possible in principle to derive the three-dimensional orientation of the vehicle provided that the antennae are not arranged linearly and a connecting line between two antennae in each case defines a base line. However, in general arrays comprising 4 antennae are used since the additional antenna introduces redundancy and further security into the system. In order to carry out the sufficiently precise position determination in the range of the carrier wavelength of the received signal, phase ambiguities must be resolved since only a shift of phases is detected by the antennae. The resolution of this phase ambiguity can be improved or accelerated by the use of further antennae.

Since as a rule signals from at least 4 satellites are received by at least 3 antennae, a combinatory problem results. For solving combinatory problems, methods which can select the optimal solution from the total number of permissible solutions, for example by means of least squares fit or of statistical methods, are used. Since, however, the total number of solutions to be investigated is as a rule very large and, particularly in the case of dynamic applications, the solution of such combinatory problems is very intensive in terms of computing, there is a need of efficient design for the algorithms used. Thus, there is interest in limiting the total number of solutions to be investigated with the use of available information as secondary conditions or restrictions, so that successive candidates can be eliminated from a set of possible solutions until the remaining solution determines the position or the orientation.

A suitable possibility for limiting the total number of candidates to be investigated is the derivation of restrictions from information known a priori, such as, for example, the known geometrical arrangement of the arrays, or from plausibility assumptions, such as, for example, a maximum limit for the inclination of a vehicle relative to the horizontal.

Methods for resolving the phase ambiguities are described, for example, in Euler, H.-J. "GPS Attitude Determination: Utilizing Auxiliary Information to obtain Improved Results", 3rd Int. Workshop, "High Precision Navigation", 3-5 Apr. 1995, Stuttgart, and Euler, H.-J., Hill, Craig D., "Attitude Determination: Exploiting all Information for Optimal Ambiguity Resolution" ION GPS 95, 12-15 Sep. 1995, Palm Springs, Calif.

In these publications, topocentric, i.e. local, coordinate systems are used for optimal utilization of known information. In the evaluation or limitation of the resolution space, the geometry between in each case two antennae in particular the spacing and height difference thereof, is used, but the calculation of the orientation of a base line in three dimensions remains complicated.

A suitable approach for the successive limitation of the resolution space is disclosed, for example, in Hill, Craig D., Euler, H.-J. "Optimal Ambiguity Resolution Technique for Attitude Determination", Proceedings of the 1996 IEEE Position Location and Navigation Symposium, PLANS, Atlanta, Ga., USA, pages 263-269.

A conventional base line method is based on the following system of linearized equations for simple differences.

$$\Delta\phi_{12}^1 = dt + (x_1^1 dx_1 + x_2^1 dx_2 + x_3^1 dx_3)/\lambda + N^1$$

$$\Delta\phi_{12}^2 = dt + (x_1 dx_1 + x_2^1 dx_2 + x_3^1 dx_3)/\lambda + N^2$$

$$\Delta\phi_{12}^3 = dt + (x_1^3 dx_1 + x_2^3 dx_2 + x_3^3 dx_3)/\lambda + N^3$$

$$\Delta\phi_{12}^4 = dt + (x_1^4 dx_1 + x_2^4 dx_2 + x_3^4 dx_3)/\lambda + N^4 \qquad (1)$$

in which $\Delta\Phi^i_{12}$ is the observed simple difference of the stations 1 and 2 relative to the satellite i, dt is the receiver clock difference $x^i_j$ is the j th component of the unit vector pointing to the satellite i, $\lambda$ is the wavelength of the carrier phase, $dx_j$ is the j th component of the unknown position vector of the second antenna and $N^i$ is the integral phase ambiguity of the simple difference, coordinated with the satellite i.

This system of 4 equations gives the relative positions of the phase centres of the two antennae, provided that the phase ambiguity is resolved or determined. The respective coordinates can subsequently be transformed into the orientation of the base line so that, from the orientation of the antenna array, the orientation of a body associated therewith can also be derived. Any integral phase-ambiguity which gives a solution for the relative coordinates which lies within a sphere having the radius of the base length is a candidate for the correct result. In addition, the combination of the—known—length of the base length with a deviation which is only minimal is to be reproduced.

If sufficient measurements are available, the phase ambiguities can be resolved, for example by the least squares method or methods of integral or mixed integral optimization.

One approach for the successive limitation of the solution space by elimination of candidates is based on the abovementioned use of information about the geometry of the antenna array.

In a topocentric reference system, the vector of the base line can be described according to $$\vec{b} = (e; n; u)$$

$$b = \sqrt{e^2 + n^2 + u^2} \qquad (2)$$

in which e, n, u are in each case the East, North and height component of the base line.

In general, the observation equation of the single difference for the base line between the antennae A1 and A2 can be stated as follows $$\Delta_{Li}\lambda_{Li}\phi_{01}^{Sn} = e_{01}\frac{e^{Sn}}{\rho_0^{Sn}} + n_{01}\frac{n^{Sn}}{\rho_0^{Sn}} + u_{01}\frac{u^{Sn}}{\rho_0^{Sn}} +_{Li} \lambda_{Li} N_{01}^{Sn} + c_{Li} t_{c01} \qquad (3)$$

in which $\Delta_{Li}\lambda_{Li}\phi_{01}^{Sn}$ is the simple difference of a carrier phase measurement for the frequency Li, e.g. the frequency L1 or L2 of the GPS system, and the satellite Sn between the antennae A0 and A1, $e_{01}, n_{01}, u_{01}$ are the east, north and height component of the base line between the antennae A0 and A1, $$\frac{e^{Sn}}{\rho_0^{Sn}}, \frac{n^{Sn}}{\rho_0^{Sn}}, \frac{u^{Sn}}{\rho_0^{Sn}}$$

are the topocentric unit vectors to the satellite Sn,
$_{Li}\lambda$ is the wavelength of the frequency Li,
$_{Li}N_{01}^{Sn}$ is the carrier phase ambiguity of the simple difference for the satellite Sn and the frequency Li,
c is the velocity of light in a vacuum and
$_{Li}t_{c01}$ is the time difference of the receiver clocks for the frequency Li and the base line between the antennae A0 and A1.

With a sufficient number of measurements to satellites, for example to four satellites in a favourable configuration, and a choice of suitable values for the phase ambiguity, the east, north and height component of the base line can be calculated.

For limiting the solution space, it is now possible to use the information about the geometry of the antenna array or plausibility assumptions. For example, the length of the base line is known, and the maximum inclination of the vehicle and of the antenna array associated therewith can be limited.

The height component thus satisfies the inequality $$u = \sqrt{b^2 - e^2 - n^2} \leq b \cdot \sin(\gamma_{max}) \quad (4)$$

so that the horizontal component of the base line follows according to $$b \geq \sqrt{e^2 + n^2} \geq b \cdot \cos(\gamma_{max}) \quad (5)$$

where $\gamma_{max}$ is the maximum permissible angle of inclination relative to the horizontal. For an exemplary value of 15°, it then follows $$u = \sqrt{b^2 - e^2 - n^2} \leq b \cdot \sin(15°) \approx b \cdot 0.2588$$

$$b \geq \sqrt{e^2 + n^2} \geq b \cdot \cos(15°) \approx b \cdot 0.9659$$

By means of these length and inclination restrictions, it is possible to rule out candidates for base lines which exceed the maximum permissible inclination, and the number of possible candidates for the correct solution can thus be reduced. Another example of a restriction is the calculation of variances from measurements to more than four satellites or for a plurality of carrier frequencies. If the value of a candidate exceeds the corresponding range of the variance, an elimination is implemented.

Since the determination of only one base line allows one degree of freedom to be undetermined, as a rule a second or secondary base line, e.g. between the antennae A0 and A2, must always be determined, which base line also specifies the rotational degree of freedom about the first or primary base line.

A possible approach now consists in first calculating primary base lines which represent a first set of candidates, with the aid of which a resolution of the phase ambiguity can be effected. From this set, candidates are eliminated in a first step by restrictions. If appropriate, the restrictions can be taken into account during the calculation of these candidates for the primary base lines, so that the set is formed only from already pre-selected candidates.

For the candidates which have not been eliminated, solutions for associated secondary base lines which form a second set coordinated with the candidates of the first set are now calculated. Here, these solutions for the primary and secondary base lines are connected by a common antenna (e.g. the antenna A0 for the base lines A0-A1 and A0-A2) and thus assigned. In principle, however, it is also possible to calculate base lines with two separate pairs of antennae. The assignment is then effected by a knowledge of the geometry of the antenna array.

For the calculated solutions of the secondary base lines, an elimination is once again effected on the basis of the restrictions applicable for these. If all associated solutions for secondary base lines are eliminated for a candidate of a primary base line, the candidate of the first base line can also be removed from the first set.

For determining the specific phase ambiguities, it is thus necessary to determine a relatively large number of solutions for these base lines before an elimination can be effected. However, generation of these solutions requires a computational effort which influences the rapidity of the resolution of the phase ambiguity and hence the determination of the orientation.

An object of the invention is to provide a method which permits improved calculation of solutions of base lines coordinated with one another.

A further object is to permit faster resolution of the phase ambiguity.

The facilitation of increased complexity of the resolution of the phase ambiguity or the improved accuracy in combination with constant fastness is a further object.

These objects are achieved, according to the invention, by the features of claim 1 and by the features of the sub claims or the solutions are further developed.

The present invention relates to a method for determining the orientation of an antenna array for a satellite-aided positioning system in which an improved calculation of solutions of secondary base lines is effected.

In the methods of the prior art, solutions for base lines are determined independently of one another and then eliminated on the basis of restrictions. A suitable restriction is the angle between the base lines, which is known from the geometry of the antenna array. Pairs of base lines which do not satisfy this restriction are eliminated from the set of possible solutions. For this approach, however, all solutions for the base lines must be generated independently of one another and then related.

On the basis of the known geometry of the antenna array, however, the primary base line and further base lines can be related to one another. In particular, it is possible to configure the rotational degree of freedom of the position of the secondary base line relative to the primary base line, i.e. as a rotation of the secondary base line about the primary base line as an axis, by an angle. Consequently this relative position is described by a single unknown parameter, the lengths and the opening angle of the two base lines being known.

The east, north and height component of the secondary base line between the antennae A0 and A2 are then given as follows $$e_{02} = \left( \cos\beta \frac{n_{01}}{\sqrt{(e_{01}^2 + n_{01}^2)}} - \sin\beta \frac{u_{01}}{s_{01}} \frac{e_{01}}{\sqrt{(e_{01}^2 + n_{01}^2)}} \right) s_{02} \sin\alpha_{012} + \frac{e_{01}}{s_{01}} s_{02} \cos\alpha_{012} \quad (6)$$

-continued $$n_{02} = \frac{\left(-\cos\beta \frac{e_{01}}{\sqrt{(e_{01}^2 + n_{01}^2)}} - \sin\beta \frac{u_{01}}{s_{01}} \frac{n_{01}}{\sqrt{(e_{01}^2 + n_{01}^2)}}\right)}{s_{02}\sin\alpha_{012} + \frac{n_{01}}{s_{01}} s_{02}\cos\alpha_{012}}$$

$$u_{02} = \left(\sin\beta \frac{\sqrt{(e_{01}^2 + n_{01}^2)}}{s_{01}}\right) s_{02}\sin\alpha_{012} + \frac{u_{01}}{s_{01}} s_{02}\cos\alpha_{012}$$

in which $e_{01}, n_{01}, u_{01}$ are the east, north and height component of the primary base line between the antennae A0 and A1, $e_{02}, n_{02}, u_{02}$ are the east, north and height component of the secondary base line between the antennae A0 and A2, β is the angle for configuring the rotational degree of freedom or the rotation of the second base line about the primary base line and $\alpha_{012}$ is the angle between primary and secondary base line.

For the unknown angle β, a range is specified within which the solutions for the associated secondary base lines are generated for each candidate. In other words, configuration is effected not with regard to the limitation of the value range in the selection from existing solutions but, according to the invention, is used in the generation of candidates to which restrictions and selection methods will be applied only later on. In the generation of the solutions, the degree of freedom can be limited by specifying a permissible value range of the parameter. Instead of unlimited generation with subsequent selection, a limited generation of candidates is effected, the number of which is then reduced in a further step.

The search in the sector coordinated with the angle β is more advantageous than a search in the sector of the solutions of phase ambiguities, since a substantially smaller number of solutions has to be analysed. For example, a search window of ±n periods requires the calculation and analysis of $(2n+1)^3$ solutions, which still means 29 791 base lines for ±15 periods. In comparison, the search in the angular sector requires the calculation of (2n+1) base lines and hence the generation of only 61 solutions for a range of ±15° with a division with 0.5° steps.

Thus, by the linkage of the possible orientation of the secondary base line to the primary base line, the method according to the invention has advantages over methods of the prior art in which the base lines are determined independently of one another. This linkage is facilitated by a formulation of the base lines in a topocentric reference system which permits simple utilization of the known geometrical relationships of the antenna array. In particular, the definition or referencing of the angle of rotation of secondary base line about primary base line can thus be effected.

The generation, according to the invention, of solutions of the secondary base lines is not limited to the above-described sequence of method steps. In particular, elimination steps can also be effected in another sequence. Thus, for example, the sequence of the introduction of restrictions can be designed to be variable. A limitation of the search sector by elimination of candidates on the basis of secondary base lines can in principle therefore also be effected before utilization of, for example, the inclination restriction for the candidates of the primary base lines. However, the sequence will generally be substantially predetermined by the efficiency of the elimination process with respect to the computational effort.

The method according to the invention is shown schematically below by means of drawings and described in more detail purely by way of example. Specifically, FIG. 1 shows an example of an antenna array comprising 4 antennae;

Figure 1:
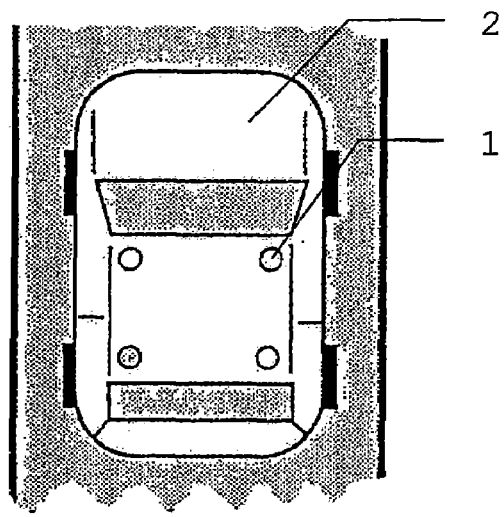

FIG. 1 schematically shows the setup of an antenna array comprising 4 antennae 1 for a satellite-aided positioning system on a vehicle 2. In this example, mounting is effected on the roof of the vehicle 2. Because of the fixed assignment of antennae 1 and vehicle 2, the orientation of the vehicle 2 can be derived from the orientation of the antenna array.

Figure 2:
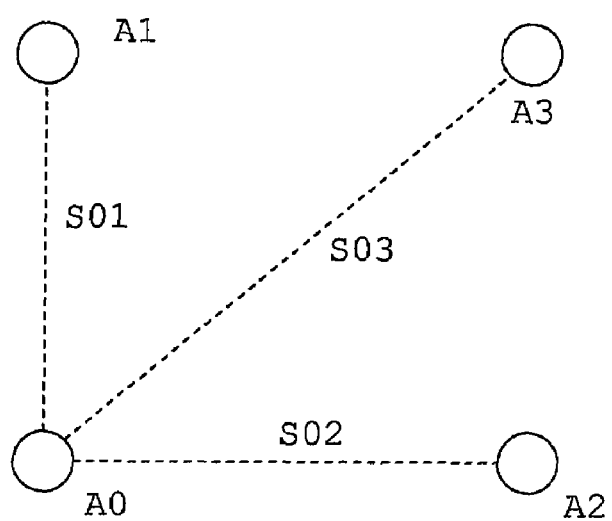
FIG. 2 shows the schematic diagram of the base lines for the antenna arrangement comprising 4 antennae.

FIG. 2 shows the geometrical relationships between four antennae A0, A1, A2 and A3 of an antenna array and the base lines defined thereby. If the connecting line between the antennae A0 and A1 is chosen as primary base line S01, the connecting lines between the antennae A0 and A2 on the one hand and A0 and A3 on the other hand define the secondary base lines S02 and S03.

Figure 3:
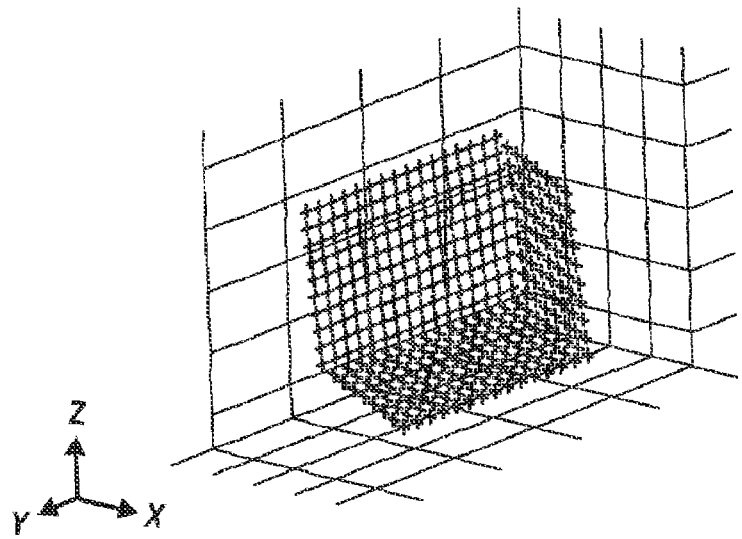
FIG. 3-5 show the schematic diagram of the limitation of a search sector.
Figure 4:
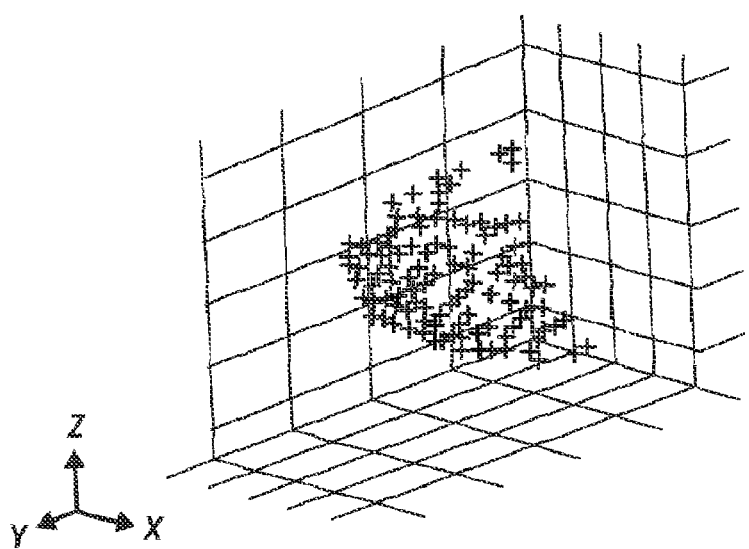
Figure 5:
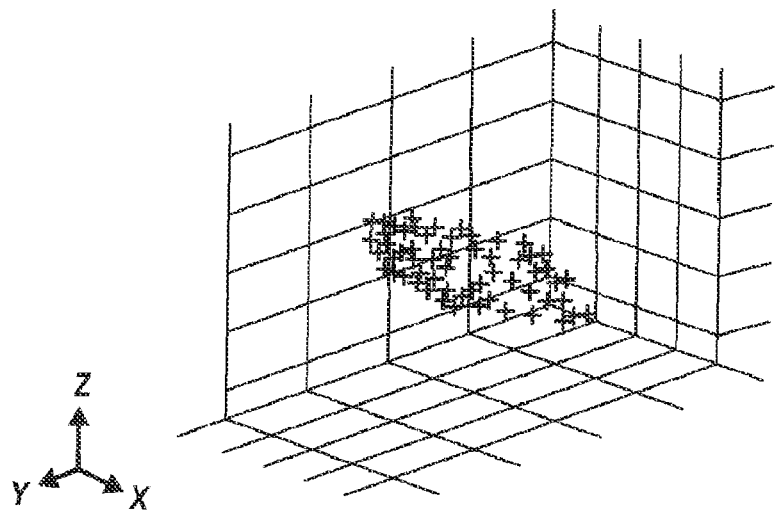

FIG. 3-5 explain successive limitation of the search sector for permissible solutions.

FIG. 3 shows the still unrestricted search sector for isolated solutions of the phase ambiguities. The solutions are localized around an approximated position for a solution of the pseudo-distance to the satellites of a satellite-aided positioning system, the spacing of the division of the sides of the sector being two metres in each case. The crosses designate different combinations for the phase ambiguity, which thus represent candidates to be analyzed. In this example, the search sector in FIG. 3 comprises 4913 permissible solutions.

Through a knowledge of the distance between two antennae, a primary base line is defined and a restriction is specified which, as a secondary condition to be complied with, reduces the sector of permissible solutions. After use of this information, as shown in FIG. 4, this still comprises 117 potential candidates.

The introduction of a further restriction leads to the limitation of the sector of permissible solutions, which limitation is shown in FIG. 5. By specifying the maximum inclination relative to the horizontal, the number of candidates in this example is reduced to 66. In order to reduce this number even further, further restrictions have to be added. One possibility is to take into account further, secondary base lines.

Figure 6:
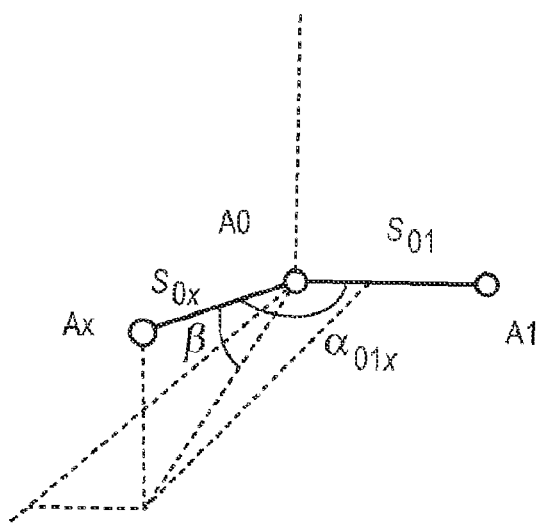
FIG. 6 shows the schematic diagram of geometrical relationships between primary and secondary base lines.

A model according to the invention for calculating these secondary base lines in association with the primary base line is shown in FIG. 6. The end points of the primary base line S01 are fixed by the antennae A0 and A1, and the end points of the secondary base line S0x are fixed by the antennae A0 and Ax. From a knowledge of the geometry of the antenna array, the geometrical angle $\alpha_{01x}$ between this primary base line S01 and secondary base line S0x can be derived. There remains as a degree of freedom the rotation of the secondary base line S0x about the primary base line S01 acting as an axis, and hence a degree of rotational freedom. This rotation is configured by the angle β. The secondary base lines S0x are now calculated according to the invention by varying the angle in discrete steps, the antenna A0 used equally for fixing the two base lines forming a common point. By means of this common point and a knowledge of the geometrical angle $\alpha_{01x}$, the two base lines are related to one another. For the secondary base lines S0x generated, restrictions are once again derived, by means of which solutions are eliminated so that the search sector is further limited.

The embodiments shown represent only examples of possible antenna arrays and are therefore not to be understood as being definitive and limiting. Moreover, the person skilled in the art can derive further antenna arrays suitable for a method according to the invention, for example by arrangement in a plurality of planes or in other geometrical forms. Furthermore, the steps of the method can be combined or integrated so that the sequence of limitations of the search sector is effected in another way.

The invention claimed is:

1. A method for determining the orientation of an antenna array comprising at least 3 antennae for receiving signals of a satellite-aided positioning system, wherein the geometry of the antenna array being known, the connecting line between a first antenna and a second antenna defining a primary base line, and the connecting line between the first antenna and a further antenna defining a secondary base line, comprising:
    with a resolution of the phase ambiguity for signals, calculating candidates for resolving the phase ambiguity for the primary base line; and
    coordinating solutions in each case for the secondary base line with the candidates calculated, wherein upon generation of the solutions, a degree of freedom of a rotation of the secondary base line about the primary base line is configured by a single parameter in order to generate secondary base lines for each candidates.

2. A method according to claim 1, wherein, on generation of the solutions, a degree of freedom of the rotation is limited by specifying a permissible value range for the parameter.

3. Method according to claim 1, wherein the resolution of the phase ambiguity includes the following acts:
    calculating a first set of candidates for resolving a phase ambiguity for the primary base line;
    eliminating the candidates which do not satisfy at least one first restriction from the first set;
    generating a coordinated set of solutions;
    eliminating the solutions which do not satisfy at least one second restriction from the coordinated set;
    removing the candidates whose coordinated set contains no solution, from the first set; and
    deriving the orientation of the antenna array from the first set and the coordinated set.

4. A method according to claim 1, wherein the degree of freedom of the rotation of the secondary base line about the primary base line is described by the following system of equations;

$$e_{0x} = \left( \cos\beta \frac{n_{01}}{\sqrt{(e_{01}^2 + n_{01}^2)}} - \sin\beta \frac{u_{01}}{s_{01}} \frac{e_{01}}{\sqrt{(e_{01}^2 + n_{01}^2)}} \right) s_{0x} \sin\alpha_{01x} + \frac{e_{01}}{s_{01}} s_{0x} \cos\alpha_{01x}$$

-continued $$n_{0x} = \left( -\cos\beta \frac{e_{01}}{\sqrt{(e_{01}^2 + n_{01}^2)}} - \sin\beta \frac{u_{01}}{s_{01}} \frac{n_{01}}{\sqrt{(e_{01}^2 + n_{01}^2)}} \right) s_{0x} \sin\alpha_{01x} + \frac{n_{01}}{s_{01}} s_{0x} \cos\alpha_{01x}$$

$$u_{0x} = \left( \sin\beta \frac{\sqrt{(e_{01}^2 + n_{01}^2)}}{s_{01}} \right) s_{0x} \sin\alpha_{01x} + \frac{u_{01}}{s_{01}} s_{0x} \cos\alpha_{01x}$$

in which,
   $e_{01}, n_{01}, u_{01}$ is the east, north and height component of the primary base line;
   $e_{0x}, n_{0x}, u_{0x}$ is the east, north and height component of the secondary base line;
   $\beta$ is the angle for configuring the degree of freedom of the rotation; and
   $\alpha_{01x}$ is the angle between primary base line and secondary base line.

5. A method according to claim 1, wherein on generating the solutions, the degree of freedom of a rotation of the secondary base line about the primary base line is configured by an angle ($\beta$).

6. A method according to claim 5, wherein, on generating a coordinated set, a permissible value range of the angle ($\beta$) is limited, in particular to the range of not more than ±15° relative to the horizontal.

7. A method according to claim 5, wherein on generating a coordinated set, the solutions are generated for discrete values of the angle ($\beta$).

8. A method according to claim 7, wherein, the solutions are generated for discrete values of the angle ($\beta$) incrementally.

9. A method according to claim 7, wherein the discrete values of the angle ($\beta$) have a spacing of 0.5°.

10. A method according to claim 5, wherein, as a second restriction, the value range of the angle ($\beta$) is limited on elimination of solutions.

11. A method according to claim 1, wherein, as a first restriction, at least one of the following variables is chosen:
    length of the primary base line; and
    angle of inclination of the primary base line relative to the horizontal.

12. A method according to claim 1, wherein the length of the secondary base line is chosen as a second restriction.

13. A method according to claim 1, wherein, on generation of a coordinated set of solutions for the secondary base line, a test is carried out to determine whether a secondary base line is already present in the coordinated set.

14. Computer program product as a recording on a data medium comprising computer executable instructions for carrying out the method according to claim 1.

* * * * *